(No Model.)

P. KALLEN.
CHURN.

No. 419,127. Patented Jan. 7, 1890.

Witnesses
C. M. Courtoye.
C. A. Adams

Inventor
Peter Kallen
By his Attorneys
C. M. Alexander

UNITED STATES PATENT OFFICE.

PETER KALLEN, OF FORT WAYNE, INDIANA.

CHURN.

SPECIFICATION forming part of Letters Patent No. 419,127, dated January 7, 1890.

Application filed October 24, 1889. Serial No. 328,017. (No model.)

*To all whom it may concern:*

Be it known that I, PETER KALLEN, a citizen of the United States, residing at Fort Wayne, in the county of Allen and State of Indiana, have invented certain new and useful Improvements in Churns, of which the following is a specification, reference being had therein to the accompanying drawings, in which—

Figure 1:
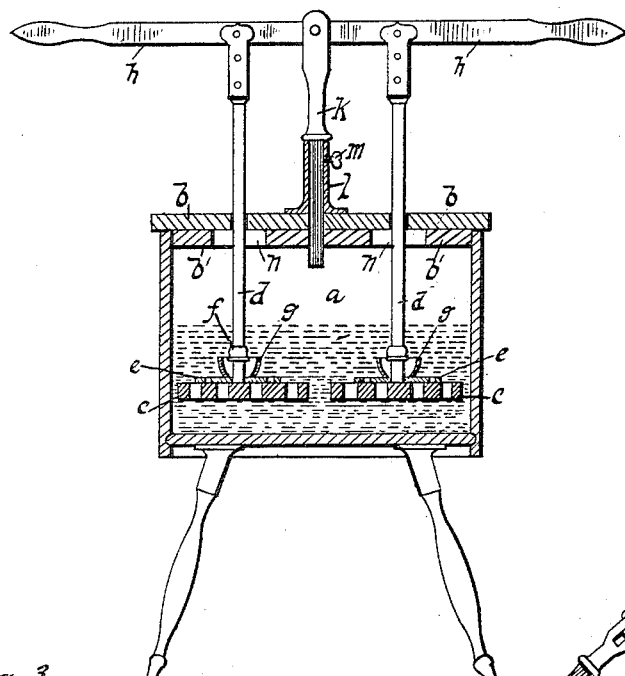
Figure 3:
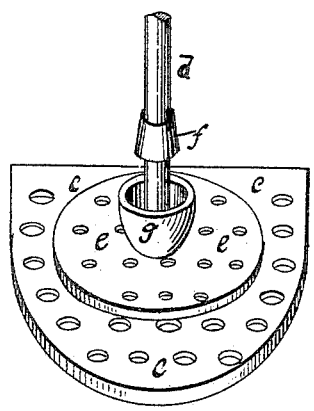
Figure 2:
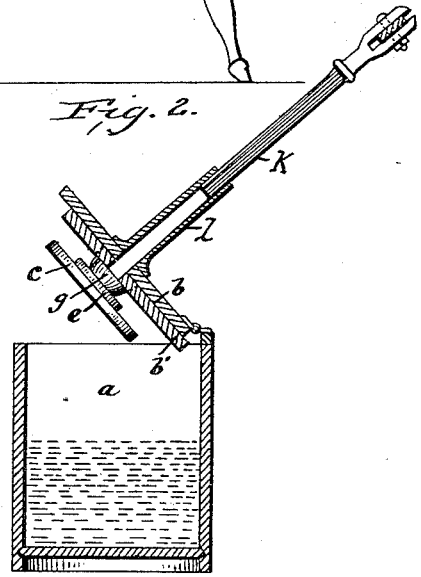

Figure 1 represents a vertical longitudinal section of the churn; Fig. 2, a vertical transverse section showing the cover thrown open, and Fig. 3 a detail perspective view of one of the dashers.

In the drawings, $a$ designates a churn-vessel, of suitable shape and capacity, mounted upon supporting-legs and provided with a hinged cover $b$, this cover being provided upon its under side with a board $b'$, adapted to fit snugly within the churn-vessel when the cover is closed and prevent leakage of the milk or cream, the cover proper resting on top of the churn. The churn-vessel is preferably approximately elliptical in cross-section. There are two dashers adapted to reciprocate simultaneously in opposite directions within the churn-body, each dasher consisting of a horizontal perforated plate $c$, attached to the lower end of a dasher-shaft $d$, which passes up through a perforation in the cover of the churn. Secured loosely upon the dasher-shafts above the plates $c$ are supplemental blades or plates $e$, provided with perforations and adapted to reciprocate between the main plates $c$ and stops $f$ upon the dasher-shafts, the adjacent faces of these two plates being comparatively smooth, so as to come close together. Secured to or formed integral with the supplemental plates $e$ are cups $g$, through the center of which the dasher-rods pass.

As thus constructed, it will be perceived that when the dashers are forced down in the cream the liquid will pass through the apertures in the blades $c$ and press the supplemental plates $e$ up against the stops $f$ on the dasher-rods; but when the dashers are raised the pressure of the liquid upon the upper sides of the supplemental plates and in the cups upon the same will force these supplemental plates down forcibly against the upper face of the main plate, crushing and breaking the globules that may be caught between them. The cups assist in pressing the supplemental plates forcibly against the main plates. The cream rushing back and forth through the perforations in the plates will be thoroughly and forcibly agitated and the globules of fat quickly broken.

It is evident that the supplemental plates may or may not be provided with perforations.

The dasher-rods are pivotally connected to an oscillating lever $h$, pivotally connected or supported upon a central post $k$, located equidistant from the two dasher-rods. By this arrangement the dashers are reciprocated in opposite directions simultaneously. The post $k$ is fitted in a central tube $l$ and is held adjustably therein by means of a set-screw $m$, the said tube being secured rigidly to the cover of the churn and the post passing down through the same, as shown. This post is either round or rectangular in cross-section, but is preferably the latter, as it will then serve to prevent binding of the dasher-rods by keeping them in line with their respective holes in the churn-cover. This manner of mounting the central post for the operating-lever not only makes the post much more rigid, but also enables the lever and dashers to be adjusted to suit the requirements of each particular operator as to height, &c. The set-screw and sleeves also permit the dashers to be drawn and held up against the cover out of the way when the cover is to be thrown back, as shown in Fig. 2, the cups $g$ fitting up in recesses $n$ in the cover. By thus providing for the drawing up of the dashers out of the way I am enabled to use churn-vessels of any desirable depth and hinged covers, as is evident.

Having thus fully described my invention, what I claim, and desire to secure by Letters Patent, is—

1. The combination of the churn-vessel, the dasher-rods provided with perforated plates $c$ and stops $f$, and the vibrating supplemental plates provided with cups and adapted to vibrate between the said stops $f$ and plates $c$, substantially as described.

2. The combination of the churn-vessel provided with a cover, the dasher-rods passing through the said cover and provided with dashers, the oscillating lever connected to the dasher-rods, the post for supporting this lever, and the tube provided with a set-screw for the reception of the said post, substantially as and for the purposes set forth.

In testimony whereof I affix my signature in presence of two witnesses.

PETER KALLEN.

Witnesses:
 FRED KRUSE,
 ALLEN B. SNIDER.